United States Patent Office 2,775,870
Patented Jan. 1, 1957

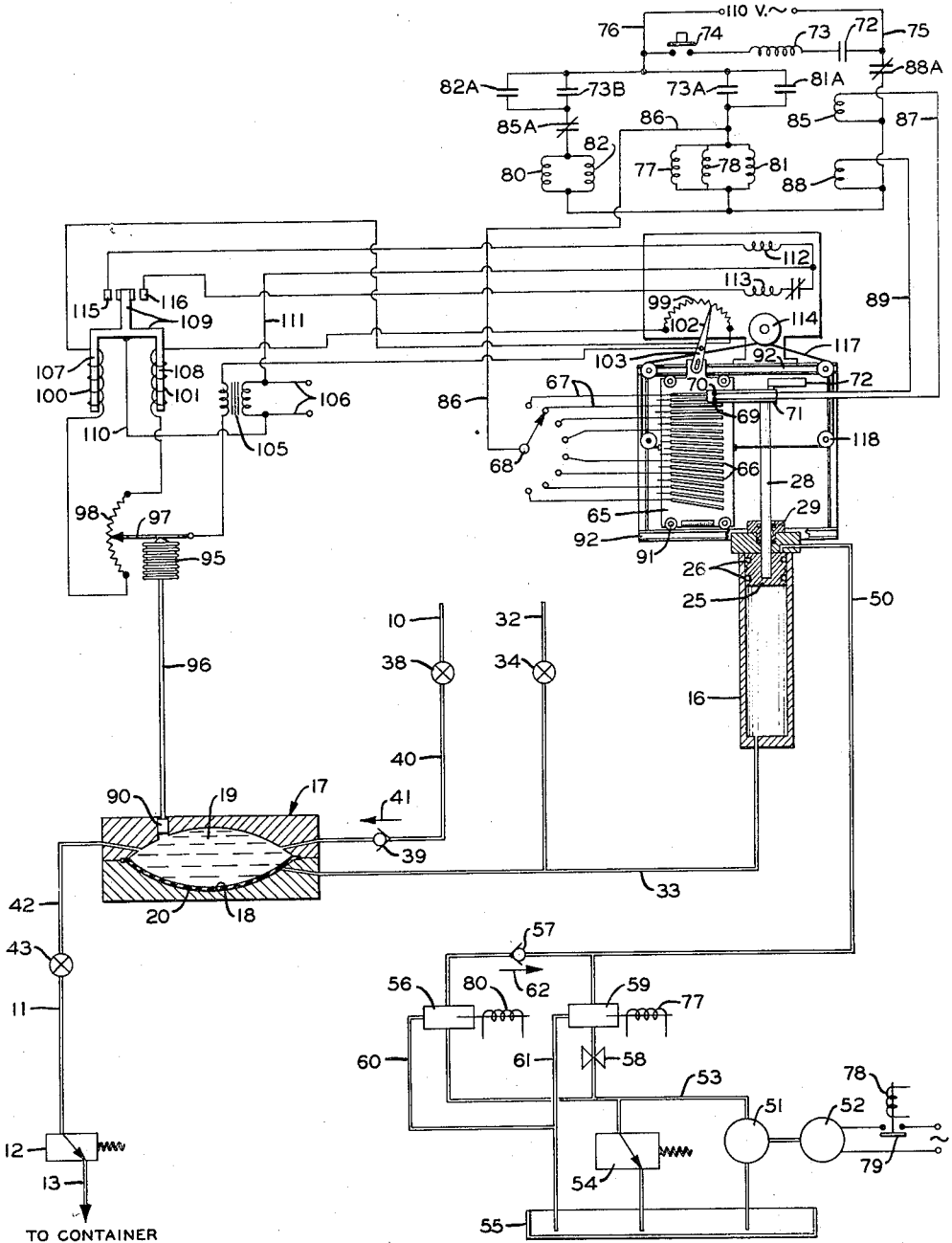

2,775,870

LIQUID METERING DEVICE

Ralph E. Bruce and Roger M. McClung, Dayton, Ohio, assignors to Production Control Units, Inc., Dayton, Ohio, a corporation of Ohio Application July 28, 1954, Serial No. 446,194

19 Claims. (Cl. 62—1)

This invention relates to a liquid dispensing or metering device and, more particularly, to an apparatus which will deliver liquid charges of uniform weight regardless of variations in the temperature of the liquid dispensed.

The liquid metering device forming the subject matter of the present application is an improvement over the apparatus shown and described in the Bruce and Goebel Patent No. 2,631,437, granted March 17, 1953. In the liquid metering apparatus shown in that patent, it was necessary to maintain the liquid being charged at a predetermined constant temperature all of the time that the apparatus was in use. This precaution was necessary because the metering device was adapted to dispense equal volumes of liquid on successive cycles of operation of the apparatus. Hence, if the temperature of the liquid being charged was permitted to fluctuate, the weight of the individual charges would vary due to variations in the specific gravity of the liquid with changes in temperature. In the patented device, therefore, heating jackets were provided for maintaining the liquid at a temperature above the ambient so that the temperature of the liquid being dispensed would always remain the same. Maintaining the temperature of the liquid constant throughout its travel through the machine and through the liquid dispensing line, however, required very careful design of the apparatus and necessitated the use of costly and delicate control mechanisms.

To overcome the problems and expense imposed by the requirement for maintaining the temperature of the liquid constant at all times from the time it entered the metering device until it left the dispensing line, we have found that an entirely new approach to the problem of maintaining the weight of liquid charge constant is productive of improved results and simplified design and construction of the charging machine. In our new and improved form of liquid charging apparatus, the temperature of the liquid is permitted to fluctuate in accordance with the ambient temperature and the weight of the individual charges of liquid is maintained uniform by controlling the volume of liquid dispensed in accordance with the temperature of the liquid. As a practical matter, it has been found much easier to adjust the displacement of the metering device in accordance with temperature changes than it was to attempt to maintain the liquid at a constant temperature all the while it was being metered and delivered to the receiver. By allowing the apparatus and the liquid being dispensed therefrom to follow the ambient temperature and controlling the volume of the liquid charged in accordance therewith, we have found that greater accuracy and more reliable operation can be attained.

Accordingly, it is an object of the present invention to provide a liquid dispensing apparatus incorporating improved means for maintaining the weight of the charges delivered thereby constant despite fluctuations in the ambient temperature.

Another object of the invention is to provide means for controlling the volume of the liquid charge dispensed by a liquid metering apparatus in accordance with the temperature of the liquid.

Another object of the invention is to provide a piston and cylinder type of metering device in which the stroke of the piston is controlled by the temperature of the liquid being metered.

Another object of the invention is to provide a temperature controlled contact board for determining the stroke of the metering piston in a liquid dispensing apparatus.

Another object of the invention is to provide a piston and cylinder type of metering device having means for reducing the speed of the piston as the quantity of liquid dispensed thereby approaches the required amount.

With these and other objects in view which will become apparent from the following description, the invention includes certain novel features of construction and combinations of parts the essential elements of which are set forth in the appended claims and a preferred form or embodiment of which will hereinafter be described with reference to the drawing which accompanies and forms a part of this specification.

The drawing is a schematic representation of a preferred form of liquid metering apparatus embodying our invention, the various parts of the apparatus being shown in the positions which they occupy when the equipment is in a stand-by condition.

The liquid metering apparatus illustrated in the drawing is particularly well suited for charging measured quantities of a liquid refrigerant under pressure into a refrigerating unit. Because of its low boiling point, the liquid must be maintained under high pressure at all times since otherwise it would flash into a gas under ambient temperature conditions. In the apparatus shown herein, the liquid line 10 is connected to a suitable supply of the liquid refrigerant which is maintained under sufficient pressure to hold it in its liquid form. In the case of "Freon," this pressure may be in the neighborhood of 175 pounds per square inch which is sufficient to maintain it as a liquid under ambient temperature conditions. The liquid metering apparatus hereinafter to be described receives a measured charge of liquid from the line 10 and forces it under a still higher pressure through a line 11 and a relief valve 12 to a discharge line 13 which may be releasably connected with the refrigerating unit or other receiver which is to receive the charge of liquid. The relief valve 12 is normally set to operate at a pressure in the neighborhood of 225 pounds per square inch so that as soon as the pressure in the line 11 exceeds this amount the liquid will pass through the valve 12 and into the discharge line 13.

Metering of a measured quantity of liquid from the supply line 10 to the discharge line 13 is effected by a metering cylinder 16 which is communicatively connected with one side of an isolator 17. The isolator comprises two closed chambers 18 and 19 separated by a flexible diaphragm 20. Consequently, when a given quantity of liquid is forced into the chamber 18, an equal quantity of liquid will be forced out of the chamber 19.

The metering cylinder 16 is fitted with a piston 25 provided with sealing rings 26 to prevent leakage of fluid past the piston. The piston 25 is fastened to a piston rod 28 which passes through a gland 29 in the end of the cylinder which also is provided with sealing rings to prevent fluid from escaping from the cylinder.

The lower or closed end of the cylinder 16 is normally filled with a hydraulic fluid such as oil supplied from a pressure line 32. The oil pressure in line 32 is preferably somewhat less than the pressure of the liquid in the supply line 10 and may, for example, be in the neighborhood of 150 pounds per square inch. When the apparatus is in a stand-by condition with the piston 25 in the upper end of the cylinder 16, oil from the supply line 32 may be admitted to the closed end of the cylinder and to a metering line 33 communicatively connecting the lower end of the cylinder with the chamber 18 of the isolator by suitable manipulation of the hand-operated shut-off valve 34. After the system is filled with oil, the valve 34 is turned off so as to isolate the supply line 32 from the metering cylinder. As will be explained at a later point in the description, the valve 34 need be operated only occasionally to make up for any slight loss of oil from the system.

The liquid supply line 10 is connected through a manual shut-off valve 38 and a check valve 39 in a line 40 with the chamber 19 of the isolator 17. The purpose of the valve 38 is to permit the line 40 to the isolator to be sealed off from the line 10 when a fresh supply drum or tank of charging liquid is being connected to the apparatus. The check valve 39 is provided in the line 40 to permit flow of liquid therethrough in one direction only as indicated by the arrow 41. This will prevent liquid from being forced back into the supply line 10 when pressure is applied to the liquid contained in the chamber 19 during a metering cycle. Instead, the liquid will be forced out through the line 42 and through a normally open shut-off valve 43 to the dispensing line 11.

The metering fluid or oil contained in the bottom part of the cylinder 16 will be forced through the line 33 into the chamber 18 of the isolator upon the downward stroke of the piston 25. The piston is operated in the cylinder 16 by means of hydraulic fluid admitted under pressure to the gland end of the cylinder through a line 50. Hydraulic fluid is delivered under pressure to the line 50 by means of a pump 51 driven by a motor 52 which supplies fluid under pressure to a line 53. The pressure in the line 53 is regulated by a relief valve 54 which bypasses the hydraulic fluid into a sump 55 when the pressure in the line 53 exceeds a predetermined amount. High pressure fluid from the line 53 may, during a metering cycle, flow into the line 50 either through a three-way solenoid valve 56 and a check valve 57, or through a needle valve 58 and a three-way solenoid valve 59.

When the apparatus is in a stand-by condition, both valves 56 and 59 are closed and the high pressure fluid in the line 53 is all returned to the sump through the relief valve 54. To prevent overheating of the hydraulic fluid during periods of stand-by, means has been provided for de-energizing the motor 52 at the conclusion of each metering cycle. Solenoid valves 56 and 59 each have one port thereof connected to a discharge line 60 and 61, respectively, which are returned to the sump 55. When both valves are closed, oil can return from the gland end of the cylinder 16 through the line 50 to the sump through valve 59 and line 61. Return to sump through valve 56 and line 60 is prevented by the check valve 57 which permits flow therethrough only in the direction of the arrow 62.

The extent of movement of piston 25 is controlled by a contact board 65 on which is mounted a plurality of individual contact bars 66 all of which or selected ones of which are connected by leads 67 to a selector switch 68. Co-operating with the bars 66 is a pair of brushes 69 and 70 carried by an arm 71 secured to the piston rod 28. These brushes control the closing of solenoid valves 56 and 59 in sequence so as to limit the stroke of the piston 25. As shown in the drawings, a home position switch 72 is connected in series with a relay coil 73 and a push-button switch 74 across power leads 75 and 76. The switch 72 is normally open but will be held closed by the arm 71 when the piston 25 is in its raised or home position. Hence, when the push button 74 is depressed, coil 73 will be energized to close normally open contacts 73A and 73B thereof. Closure of contact 73A will establish a circuit through solenoid 77 of valve 59 and through solenoid 78 of a motor starting switch 79 which controls the running of motor 52. Closure of contact 73B will cause solenoid 80 of valve 56 to be energized thereby opening this valve. Closure of contacts 73A and 73B will also energize coils 81 and 82 of hold relays and cause normally open contacts 81A and 82A thereof to be closed. Closure of contacts 81A and 82A will maintain solenoids 77, 78 and 80 energized after push button 74 has been released to break the circuit through relay coil 73 and allow contacts 73A and 73B to open. Motor 52 will continue to run and pump hydraulic fluid through valves 56 and 59 and line 50 into the gland end of the cylinder 16 until the leading brush 69 engages with the bar 66 which has been selected by switch 68. Upon engagement of the brush 69 with the selected contact bar 66, a circuit will be established through a relay coil 85 by way of leads 86 and 87 which connect the coil across the power lines and cause it to be energized. This causes normally closed contact 85A of the relay to open thereby de-energizing solenoid 80 of valve 56, permitting this valve to close so that all hydraulic fluid delivered to the line 50 must now pass through the needle valve 58 and valve 59. At the same time, relay coil 82 is de-energized thereby permitting contacts 82A thereof to open. Piston 25 of the metering cylinder will continue its downward stroke but at a reduced rate of speed due to the restriction in the line provided by needle valve 58. Although valve 56 is now closed, check valve 57 will prevent the high pressure fluid in line 50 from discharging into the sump 55 through line 60.

Metering piston 25 continues its downward stroke until the trailing brush 70 engages the selected contact bar 66 whereupon a circuit is established through a relay coil 88 through leads 86 and 89 which connect the coil across the power line. Energization of relay coil 88 causes normally closed contact 88A of the relay to open thereby de-energizing solenoids 77 and 78 which control the valve 59 and motor switch 79, respectively. Hence, the valve 59 will close thereby cutting off any further flow of high pressure fluid through the valve into the line 50 and the motor 52 will stop. At the same time, the line 50 will be connected through the valve to the sump line 61 thereby releasing pressure in the line 50. Consequently, the piston 25 will be free to return to its raised or home position by reason of the pressure in liquid line 10 which is transmitted through the isolator 17 to the line 33. The relief valve 12 in the dispensing line 11 will immediately close upon release of pressure in the line 50 to prevent any return flow of liquid through the line 11 into the isolator chamber 19. When the piston 25 reaches its home position, the switch 72 will again be closed and the apparatus will remain in a stand-by condition ready for the next charging cycle.

From the foregoing description it will be noted that a charging cycle is initiated by depression of push button 74 which will open valves 56 and 59 and start motor 52 to pump hydraulic fluid through line 50 into the upper end of cylinder 16. This will cause the piston 25 to move downwardly and force oil through the line 33 into the chamber 18 of the isolator 17. At the same time, the liquid to be metered will be forced out of the chamber 19 of the isolator and through the relief valve 12 into the discharge line 13. Check valve 39 prevents backward flow through the line 40 to the liquid supply line 10.

The quantity of liquid charged will depend upon the contact bar 66 selected by the selector switch 68. Each bar represents a given weight of liquid to be charged and the downward stroke of the piston 25 will be determined by the particular bar selected. When the brush 69 engages the selected bar, the speed of the piston 25 will be reduced to prevent overshooting due to the inertia of the piston and of the oil in the line 50. When the brush 70 makes contact with the selected bar 66, the piston will stop and the preselected weight of charge of liquid will now have been dispensed from the apparatus through the discharge line 13. The piston 25 will immediately return upwardly due to the pressure of the liquid in line 10 which can flow through check valve 39 into the chamber 19 to refill this chamber. The pressure of the liquid, however, is not sufficient to operate the relief valve 12 so that there will be no flow of liquid through the discharge line 13. The flexible diaphragm 20 of the isolator will be forced downwardly by the liquid in chamber 19 to displace oil from the chamber 18 through the line 33 to the lower end of the cylinder 16, thereby returning the piston 25 to its home position.

Since the density of the liquid in the charge will vary with changes in temperature thereof, the weight of the charge will vary in accordance with changes in temperature unless some means is provided for compensating for the change in density. As hereinbefore mentioned, in the liquid charging apparatus described in U. S. Patent No. 2,631,437, the liquid to be dispensed was heated to a temperature which was normally above the ambient temperature and maintained at this temperature so as to keep the density of the liquid constant. While this proved to be a satisfactory means for maintaining the weight of the liquid charges uniform, it required careful design of the equipment and also necessitated costly instrumentation to maintain the temperature uniform. In the present apparatus, no attempt is made to control the temperature of the liquid being charged and it is permitted to follow the ambient temperature at all times. Uniformity in the weight of the liquid charges is obtained by controlling the volume of the charge in accordance with the temperature of the liquid so as to compensate for changes in density. For this purpose, a temperature bulb 90 is incorporated in the isolator 17 so as to be in contact with the liquid in the chamber 19 thereof. Variations in temperature of the liquid to be charged are therefore measured by the pressure in the bulb 90 and means are provided for adjusting the position of the contact board 65 in accordance with the temperature changes measured by the bulb 90. As shown in the drawing, the board 65 is fitted with four rollers or wheels 91 which run on tracks 92 supported in fixed relation to the metering cylinder 16. The contact bars 66 are each inclined with respect to the direction of travel of the contact board along the tracks 92, the amount of inclination increasing from top to bottom to take care of the greater volume of liquid metered upon increased displacement of the piston 25. As the temperature of the liquid in the chamber 19 increases, the contact board 65 is moved to the left as viewed in the drawing, thereby increasing the volume of the charge to compensate for the reduced density of the liquid with the increase in temperature. By selecting the correct inclination of each bar 66, the individual bars may each be made to represent a predetermined weight of charge for any temperature of the liquid within a prescribed temperature range such as, for example, from 50° to 120°.

The means whereby the variation of pressure in the temperature bulb 90 controls the positioning of the contact board 65 includes a bellows 95 which is connected with the bulb by a tube 96. The bellows is operatively connected to the sliding contact 97 of a potentiometer 98 which is connected in series with a second potentiometer 99 through a pair of solenoid coils 100 and 101. The sliding contact 102 of the potentiometer 99 is provided with an arm 103 which is connected by a pin and slot arrangement with an extension of the contact board 65. The temperature controller device is supplied with electrical power through a transformer 105 the primary winding of which is connected to a power line 106. The secondary winding of the transformer has one end thereof connected to the sliding contact 97 of the potentiometer 98 and the other end thereof connected to sliding contact 102 of potentiometer 99. The current supplied to these sliding contacts 97 and 102 will thereby divide and flow through the windings of the potentiometers and through the solenoids 100 and 101. These solenoids operate magnetically on arms 107 and 108 of a contactor 109 which is connected by a lead 110 to one side of the power line 106. The other side of the power line is connected through a lead 111 with one end of each of a pair of field windings 112 and 113 of a reversible electric motor 114. The opposite end of each field winding is connected by a suitable lead with contacts 115 and 116 disposed on opposite sides of the contactor 109. The motor 114 drives a cable 117 which is led around pulleys 118 and connected to opposite sides of the contact board 65. Accordingly, when the current flowing through the solenoids 100 and 101 is equal, the contactor 109 will remain centered and the motor 114 will remain at rest. If the temperature of the liquid in chamber 19 should now increase due to a similar change in the ambient temperature, the pressure in the bulb 90 will increase thereby extending the bellows 95 and moving the sliding contact 97 upwardly. This causes an increase in the flow of current through the solenoid 101 over that flowing in the solenoid 100 so that the contactor 109 will be moved clockwise to engage with contact 116. This will energize field winding 113 and cause motor 114 to operate counterclockwise thereby moving the board 65 to the left so as to provide for a slight increase in the stroke of the piston 25 to compensate for the decreased density of the liquid. At the same time, the slider 102 of potentiometer 99 will be moved to the right to thereby decrease the resistance in the circuit of solenoid 100 and cause the current flow through the solenoid 100 to increase to again center the contactor 109 and stop movement of the board 65. In this way, the contact board is caused to follow changes in temperature of the liquid in chamber 19 of isolator 17, the position of the board always corresponding to the temperature of the liquid.

As shown in the drawing, the selector switch 68 is connected by leads 67 only to certain of the contact bars 66. This is because it is ordinarily desirable to select only a limited number of given weights of charges at a particular time. The leads 67 are preferably provided with plug-in connectors to the bars 66 so that the selection may be changed in accordance with varying requirements. Of course, if desired, a selector switch could be provided having sufficient capacity to connect each of the bars 66 with the lead 86.

As stated earlier herein, the hand valve 34 connecting the oil supply line 32 with the metering line 33 is operated from time to time with the apparatus in a stand-by condition to make up for any loss of oil from the cylinder 16, line 33 or chamber 18. When the apparatus is in a stand-by condition, the diaphragm 20 is deflected downwardly against the bottom of the chamber 18 and the piston 25 is against the upper end of the cylinder 16. Should there be any loss of oil from the system, the piston 25 would stand a little below its home position and the switch 72 would remain open, thereby preventing initiation of a metering operation. To return the piston to its home position, the valve 34 may be opened to supply oil under pressure to the cylinder 16 and return the piston to its raised position. At this time the line 50 is connected through line 61 to sump 55 so that the piston is free to move upwardly under the influence of the pressure in line 32. As heretofore noted, the pressure in line 32 is less than that in liquid line 10 so that upon opening valve 34 the diaphragm 20 will not be deflected upwardly but will remain in its depressed position.

The operation of our improved form of liquid metering apparatus is as follows:

Assuming that it is desired to dispense a series of liquid charges of 5¼ ounces through the discharge line 13, the selector switch 68 is set to connect the contact bar 66 representing a fluid charge of this weight to the line 86. The discharge line 13 is then connected to the unit or container which is to receive the charge of liquid and the push button 74 is depressed. Upon depression of the push button, valves 56 and 59 will be opened and motor 52 will be energized to cause hydraulic fluid to be forced through the line 50 and into the gland end of the cylinder 16. The piston 25 will thereby be forced down to displace oil from the closed end of the cylinder through the line 33 and into the chamber 18 under high pressure. Liquid will thereby be displaced from the chamber 19 through the line 11 and relief valve 12 into the discharge line 13 under a pressure exceeding the pressure setting of the valve 12. When the brush 69 makes contact with the selected contact bar 66, the valve 56 will be closed and the speed of movement of the piston reduced. Thereafter, when the brush 70 makes contact with the selected bar, the valve 59 will be closed to prevent further flow of liquid through the line 50 and to vent the line to sump. The piston 25 will now have traveled downwardly to an extent sufficient to displace a volume of oil from the cylinder equal to 5¼ ounces of liquid irrespective of the temperature of the liquid since the contact board 65 is continually adjusted to take up a position corresponding to the temperature of the liquid and to automatically compensate the travel of the piston in accordance therewith. When pressure in line 50 is released, relief valve 12 will immediately close and pressure from liquid supply line 10 will return the diaphragm 20 to its depressed position, thereby forcing fluid through line 33 into the bottom of cylinder 16 to return the piston 25 to home position. The apparatus is then in a stand-by condition ready for the next charging cycle which may be initiated upon depression of push button 74. The unit or container which has been charged with liquid delivered by the apparatus may then be disconnected from the line 13 and the line connected to the next unit to be charged.

While we have described our invention in connection with one possible form or embodiment thereof and have used, therefore, certain specific terms and language hereing, it is to be understood that the present disclosure is illustrative rather than restrictive and that changes and modifications may be resorted to without departing from the spirit or scope of the claims which follow.

Having thus described our invention, what we claim as new and useful and desire to secure by United States Letters Patent, is:

1. An apparatus for measuring and dispensing liquid charges of uniform weight under variable temperature conditions comprising a reservoir of the liquid to be metered, a dispensing line communicatively connected with said reservoir, and means for delivering a liquid charge of predetermined weight from said reservoir to said dispensing line, said means including a variable displacement metering device, and electrically actuated means for controlling the displacement of said device in accordance with the temperature of said liquid so as to maintain the weight of each charge uniform irrespective of changes in the specific gravity of the liquid.

2. The apparatus of claim 1 wherein said metering device includes a cylinder, and a piston working in said cylinder.

3. The apparatus of claim 2 wherein said cylinder is of the double-acting type with one end of said cylinder operating to measure the charge being dispensed, and the other end thereof constituting a hydraulic motor for operating the piston.

4. The apparatus of claim 3 including a source of fluid pressure for operating said motor, and means operated by said controlling means for shutting off the flow of fluid to said motor after said metering device has delivered a predetermined weight of liquid to said dispensing line.

5. The apparatus of claim 4 wherein said last-named means includes a temperature responsive contact board.

6. The apparatus of claim 5 including a pair of contacts carried by said piston for cooperation with said board, said contacts being spaced apart in the direction of travel of said piston, and means controlled by the leading contact of said pair for reducing the speed of said motor as the quantity of liquid metered approaches the required amount.

7. The apparatus of claim 6 including means controlled by the trailing contact of said pair for stopping said motor when the quantity of liquid metered equals the required amount.

8. A temperature controlled metering unit for a liquid dispensing apparatus comprising a movable contact board, means responsive to the temperature of the liquid being dispensed for moving said board to a position corresponding to the temperature of the liquid, a variable displacement device for metering the liquid to be dispensed, contact means movable by said device across the face of said board at right angles to the direction of movement thereof, the displacement of said contact means corresponding to the volume of liquid metered by said device, a series of contact bars extending across the face of said board, said bars being inclined with respect to the direction of movement of said board and each bar representing the volume of liquid which must be delivered by said variable displacement device at the different temperatures to cause a charge of predetermined weight to be dispensed by the apparatus.

9. The unit of claim 8 including means energized by engagement of said contact means with the bar representing the weight of the charge to be dispensed for terminating the metering of liquid by said variable displacement device.

10. In a fluid metering system of the type in which a measured quantity of the fluid to be metered is forced under pressure into a fluid dispensing line, the combination of an isolator unit for receiving a given volume of hydraulic fluid and for delivering an equal volume of the liquid to be metered to the dispensing line, a metering cylinder communicatively connected with said isolator unit, a piston in said cylinder for forcing a measured volume of hydraulic fluid from said cylinder into said unit to cause an equal volume of liquid to be dispensed, and electrically actuated means for adjusting the volume of hydraulic fluid forced into said unit in accordance with the temperature of the liquid to maintain the weight of the liquid dispensed uniform despite variations in the specific gravity thereof.

11. In a liquid metering device of the type in which liquid charges of uniform weight are dispensed therefrom under variable temperature conditions, the combination of an isolator unit having a pair of chambers separated by a movable wall, a liquid dispensing line connected with one of said chambers, a variable displacement metering device connected with the other of said chambers, means for causing said metering device to deliver a measured volume of hydraulic fluid to said other chamber whereby an equal volume of liquid to be metered will be forced out of said one chamber and into said dispensing line, and electrically actuated means for controlling the displacement of said metering device in accordance with the temperature of said liquid in order to maintain the weight of the charge dispensed from said line uniform under different temperature conditions.

12. In a liquid metering device of the type in which liquid charges of uniform weight are dispensed therefrom under variable temperature conditions, the combination of an isolator unit having a pair of chambers separated by a movable wall, a liquid dispensing line connected with one of said chambers, a metering cylinder communicatively connected with the other of said chambers, a piston in said cylinder for forcing a measured volume of hydraulic fluid from said cylinder into said other chamber whereby an equal volume of liquid to be metered will be forced out of said one chamber and into said dispensing line, and electrically actuated means for varying the stroke of said piston in accordance with the temperature of the liquid being dispensed to maintain the weight of the dispensed charges uniform despite variations in the temperature of the liquid.

13. The liquid metering device of claim 12 wherein said last mentioned means includes a temperature controlled contact board.

14. The liquid metering device of claim 13 including means for moving said board to a position corresponding to the temperature of the liquid being metered.

15. The liquid metering device of claim 14 including a series of individual contact bars on said board, said bars each corresponding to a liquid charge of predetermined weight.

16. The liquid metering device of claim 15 including a contact moving with said piston for engaging the different contact bars seriatim as the piston moves to discharge the hydraulic fluid from said cylinder.

17. The liquid metering device of claim 16 wherein said bars are inclined with respect to the direction of movement of said board so that said contact will negage a given bar in different positions of the piston depending on the temperature setting of said board.

18. A device for dispensing a liquid charge of a predetermined weight irrespective of variations in the temperature of said liquid comprising a cylinder and a piston operating therein for metering the quantity of liquid to be dispensed, and means controlled by the temperature of the liquid for determining the stroke of the piston, said means including a fluid motor for operating said piston, electro-mechanical means for controlling the operation of said motor, and an electrical contact apparatus for actuating said electro-mechanical means to stop said motor after a predetermined stroke of the piston.

19. The device of claim 18 wherein said electrical contact apparatus includes a series of movable contact bars, means for moving said bars in response to a change in temperature of the liquid, and a contact moving with said piston for contacting said bars seriatim until a preselected bar is reached.

References Cited in the file of this patent

UNITED STATES PATENTS

| | | |
|---|---|---|
| 2,063,892 | Hazard | Dec. 15, 1936 |
| 2,095,522 | Hedjuk et al. | Oct. 12, 1937 |
| 2,631,437 | Bruce et al. | Mar. 17, 1953 |